United States Patent
Niederoest et al.

(10) Patent No.: US 6,372,812 B1
(45) Date of Patent: Apr. 16, 2002

(54) HIGHER SUPPORT, LOWER DENSITY CUSHIONING FOAMS

(75) Inventors: Beat Niederoest, Marlton; Robert Mohr, Williamstown, both of NJ (US); Rocco P. Triolo, Broomall, PA (US); Chiu Y. Chan, Wilmington, DE (US)

(73) Assignee: Foamex L.P., Linwood, PA (US)

( * ) Notice: Subject to any disclaimer, the term of this patent is extended or adjusted under 35 U.S.C. 154(b) by 0 days.

(21) Appl. No.: 09/789,056

(22) Filed: Feb. 20, 2001

(51) Int. Cl.$^7$ ................................................ C08G 18/28
(52) U.S. Cl. ........................ 521/137; 521/130; 521/174
(58) Field of Search ................................. 521/130, 137, 521/174

(56) References Cited

U.S. PATENT DOCUMENTS

| | | |
|---|---|---|
| 4,285,893 A | 8/1981 | Contastin |
| 4,777,186 A | 10/1988 | Stang et al. |
| 4,783,291 A | 11/1988 | Pagan |
| 4,883,825 A | 11/1989 | Westfall et al. |
| 5,128,381 A | 7/1992 | Tane et al. |
| 5,130,346 A | 7/1992 | Ishii et al. |
| 5,194,453 A | 3/1993 | Jourquin et al. |
| 5,369,138 A | 11/1994 | Gansen |
| 5,476,619 A | 12/1995 | Nakamrea et al. |
| 5,521,226 A | 5/1996 | Bleys |
| 5,605,939 A * | 2/1997 | Hager ........................ 521/174 |
| 5,668,378 A | 9/1997 | Treboux et al. |
| 5,674,920 A | 10/1997 | Obata et al. |
| 5,698,609 A | 12/1997 | Lockwood et al. |
| 5,804,113 A | 9/1998 | Blackwell et al. |
| 5,968,993 A * | 10/1999 | Bleys ........................ 521/137 |

FOREIGN PATENT DOCUMENTS

WO          93 099 34          5/1993

* cited by examiner

Primary Examiner—John M. Cooney, Jr.
(74) Attorney, Agent, or Firm—Connolly Bove Lodge & Hutz LLP

(57) ABSTRACT

Polyurethane foams formed under vacuum (below atmospheric pressure) conditions using methylene diisocyanate or a specific mixture of polyisocyanate and with a major portion of methylene diisocyanate (MDI) with a specific mixture of polyether and graft polyols produces cushioning foams with lower density (1.4 to 1.8 pounds per cubic foot) and higher support factor (above 2.4). The foam-forming ingredients are mixed together and foamed under controlled pressures in the range 0.5 to 0.9 bar (absolute), preferably 0.6 to 0.8 bar (absolute). A major portion of the MDI is 4,4' methylene diisocyanate.

19 Claims, 2 Drawing Sheets

HIGHER SUPPORT, LOWER DENSITY CUSHIONING FOAMS

This invention relates to flexible polyurethane foams used in furniture and seat cushions, and as components of bedding mattresses and mattress pads. Produced under vacuum conditions from certain foaming mixtures, the foams of this invention have higher support factors at lower densities than more conventional polyurethane foams previously used in these applications.

BACKGROUND OF THE INVENTION

Cellular polyurethane structures typically are prepared by generating a gas during polymerization of a liquid reaction mixture comprised of a polyester or polyether polyol, a polyisocyanate, a surfactant, catalyst and one or more blowing agents. The gas causes foaming of the reaction mixture to form the cellular structure. The surfactant stabilizes the structure.

Polyurethane foams with varying density and hardness may be formed. Hardness is typically measured as IFD ("indentation force deflection") or CFD ("compression force deflection"). Specifically, $IFD_{25}$ is the force required to compress the foam to 25% of its original thickness or height, and $IFD_{65}$ is the force required to compress the foam to 65% of its original thickness or height. Tensile strength, tear strength, compression set, air permeability, fatigue resistance, support factor, and energy absorbing characteristics may also be varied, as can many other properties. Specific foam characteristics depend upon the selection of the starting materials, the foaming process and conditions, and sometimes on the subsequent processing. Among other things, polyurethane foams are widely used for cushioning applications, such as seat cushions, furniture cushions, pillows and mattress pads, and as components of mattresses.

In many cushioning applications, the cushioning effectiveness is measured by the support factor, which is the ratio of $IFD_{65}$ to $IFD_{25}$. A high support factor value is generally associated with higher cushioning comfort. Physically, a high $IFD_{65}$ value is preferred. A low $IFD_{65}$ value indicates that the foam may "bottom out" without offering very much cushioning support. A lower $IFD_{25}$ value is preferred because a foam with a lower $IFD_{25}$ value usually has a softer initial feel, which is perceived as providing more cushioning comfort. A higher support factor generally results for foams with the combination of higher cushioning support and better cushioning comfort.

Once the foam-forming ingredients are mixed together, it is known that the foam may be formed under either elevated or reduced controlled pressure conditions. PCT Published Patent Application WO 93/09934 discloses methods for continuously producing slabs of urethane polymers under controlled pressure conditions. The foam-forming mixture of polyol, polyisocyanate, blowing agent and other additives is introduced continuously onto a moving conveyor in an enclosure with two sub-chambers. The foaming takes place at controlled pressure. Reaction gases are exhausted from the enclosure as necessary to maintain the desired operating pressure. The two sub-chambers, a saw, and air tight doors are operated in a manner that allows for continuous production of slabstock polyurethane foam.

U.S. Pat. No. 5,804,113 to Blackwell, et al., shows a method and apparatus for continuously producing slabstock polyurethane foam under controlled pressure conditions in which a layer of gas surrounds the reaction mixture during free rise expansion of the reaction mixture to prevent pressure fluctuations. Blackwell generally describes foam reaction mixtures that may include a variety of polyols and polyisocyanates, and does not express preference for any specific combinations. The working examples use only conventional TDI.

U.S. Pat. No. 4,777,186 to Stang, et al., describes a method of foaming in a pressurized chamber held above atmospheric pressure (i.e., in the range of about 0.5 to 1000 psig). In addition to the gases emitted during foaming, additional gases may be introduced into the chamber to maintain the elevated pressure during foaming. The resulting foams have a higher ILD to density ratio than those previously known in the art.

U.S. Pat. No. 5,698,609 to Lockwood, et al. discloses energy absorbing foams intended for use in shipping and packaging containers. The open cell polyurethane foams are prepared from a combination of specific polyols reacted with diphenylmethane diisocyanate (MDI) and polyphenylmethylene diisocyanate (poly-MDI) at atmospheric pressure. The resulting foams have a higher density from 1.5 to 5 pounds per cubic foot, preferably 2.0 to 3.0 pounds per cubic foot, and an air flow of 0.05 to 0.5 scfm.

Flexible polyurethane foams with high densities in the range of 35 to 70 kg/m$^3$ (or 2.2 to 4.4 lb/ft$^3$) are produced by the method disclosed in U.S. Pat. No. 5,194,453 to Jourquin, et al. Polyether polyols with molecular weights in the range of 1400 to 1800 and having primary hydroxyl group content over 50% are reacted with organic polyisocyanates that may be TDI, MDI or mixtures of TDI with MDI. The foams may be produced by frothing the reaction mixture, or alternatively, under vacuum conditions. Support factor was not reported, although deformation tests were conducted and the foams are indicated to have improved comfort properties.

Higher density polyurethane foams (30 kg/m$^3$ or about 1.9 lb/ft$^3$) are produced with the polyol combinations disclosed in U.S. Pat. No. 5,668,378 to Treboux, et al. The foam-forming mixture includes 80 to 99.8 percent by weight of a high functionality polyol or polyol blend with 8 to 25% EO, functionality from 3.2 to 6.0 and an equivalent weight of 1000 to 4000, a minor portion of a graft polyol, and an organic polyisocyanate that preferably is a mixture of TDI. The foams are foamed at atmospheric pressure.

Foams with lower density, but still excellent support characteristics are continually sought for furniture, mattress components and pillows. Such lower density foams make it possible to reduce the total weight without compromising comfort. The prior art does not disclose methods for making high resilience polyurethane foams with lower densities yet higher support factors.

SUMMARY OF THE INVENTION

According to the invention, flexible, high resilience, polyurethane cushioning foams with higher support factors at lower or equivalent densities are produced using a method comprising preparing a foam reaction mixture and foaming that mixture at vacuum conditions, preferably at pressures in the range of 0.5 to 0.9 bar (absolute), most preferably 0.6 to 0.8 bar (absolute). The reaction mixture contains (a) a polyol mixture of (i) about 40 to 90 percent by weight total polyols of a polyether polyol having a primary hydroxyl group content of greater than 75 percent and from 14 to 30 percent ethylene oxide groups, and having a hydroxyl number in the range of about 20 to 36 and a functionality from 2.8 to 3.5, and (ii) about 10 to 60 percent by weight total polyols of a graft polyol having a ratio of styrene to acrylonitrile of about 70 to 30, and having a hydroxyl number in the range of about 25 to 50 and a functionality from 2.5 to 3.0; (b) an organic polyisocyanate selected from the group consisting of methylene diisocyanate and methylene diisocyanate mixed with toluene diisocyanate, wherein if a mixture of methylene diisocyanate and toluene diisocyanate is used, the polyisocyanate mixture comprises from about 5 to 20 percent by weight toluene diisocyanate and about 80 to 95 percent by weight methylene diisocyanate, wherein at least 50 percent of the methylene diisocyanate is 4,4' methylene diisocyanate, and wherein the isocyanate index is in the range of 95 to 110; and (c) from about 2 to 3.5 parts per hundred parts polyol of water as a blowing agent.

Most preferably, the foam-forming composition contains up to 2 parts per hundred parts polyol of an amine catalyst, up to 2 parts per hundred parts polyol of a surfactant, up to 0.5 parts per hundred parts polyol of an organotin catalyst, and up to 2 to 6 parts per hundred parts polyol of a cross linking agent.

In addition, excellent results have been obtained using a polyol combination of (a) from 50 to 70% by weight total polyols of polyether polyol (functionality 3.1 to 3.3), having a primary hydroxyl group content of greater than 75 percent and from 14 to 20 percent EO groups and a hydroxyl number in the range of 28 to 32, and (b) about 30 to 50 percent by weight total polyols of a graft polyol having a ratio of styrene to acrylonitrile of about 70 to 30, and having a hydroxyl number in the range of about 25 to 30 and a functionality from 2.6 to 2.9. Moreover, the polyisocyanate mixture, if a mixture is used, most preferably contains no more than 10% by weight toluene diisocyanate and at least 55 % by weight 4,4' methylene diisocyanate, with an isocyanate index in the range of 100 to 105. In this preferred embodiment, from about 2.8 to 3.2 parts per hundred parts polyol of water as a blowing agent; and up to 1.0 parts per hundred parts polyol of a surfactant are included in the reaction mixture.

The resulting lower density, high resilience polyurethane foams have densities in the range of 1.4 to 1.8 pounds per cubic foot, and a support factor (SAG) above about 2.4, preferably above about 2.5.

DESCRIPTION OF THE PREFERRED EMBODIMENT

Figure 1:
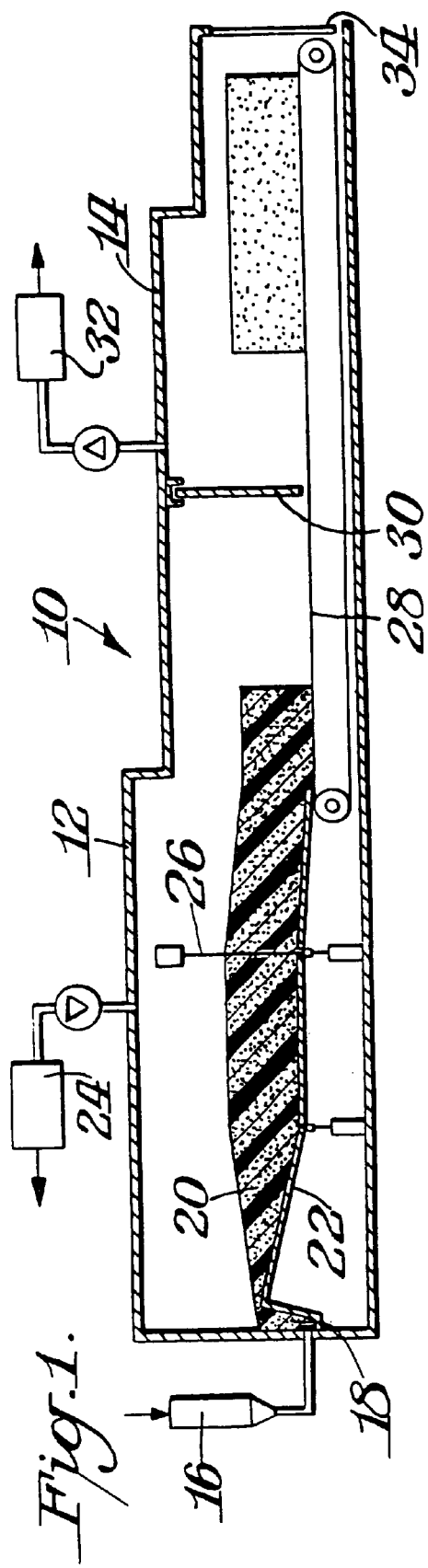
FIG. 1 is a schematic drawing of an apparatus that may be used to form foams under controlled pressures below atmospheric pressure.

Polyether polyols used to prepare flexible polyurethane foams typically have molecular weights between 500 and 7000. One example of these conventional polyols is VORANOL® 3010 from Dow Chemical, which has a hydroxyl ("OH") number of 56 mg KOH/g, with an EO content of 8.5%. Often, a group of higher EO polyols is used for high resiliency (HR) foam formulations. One example is VORANOL® 4001 from Dow Chemical, which has an OH number of 31 and a functionality of 3.2, with an EO content of 15.5%. Another example is VORANOL® 5815, also from Dow Chemical, which has an OH number of 28 and a functionality of 3.0 with an EO content of 20%. Another polyol is U-2000 from Bayer AG. U-2000 has a hydroxyl number of 31 mg KOH/g and a functionality of 3.3, and an EO content of 14.3%.

The term "polyether polyol" includes linear and branched polyethers (having ether linkages) and containing at least two hydroxyl groups, and includes polyoxypropylene polyether polyol or mixed poly (oxyethylene/oxypropylene) polyether polyol. Preferred polyethers are the polyoxyalkylene polyols, particularly the linear and branched poly (oxyethylene) glycols, poly (oxypropylene) glycols and their copolymers. Graft or modified polyether polyols are those polyether polyols having a polymer of ethylenically unsaturated monomers dispersed therein. Representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea. Graft or modified polyether polyols contain dispersed polymeric solids. The solids increase hardness and mechanical strength of the resultant foam. Especially preferred graft polyols in this invention are ARCOL HS-100 from Bayer AG or Dow VORANOL 3943.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl groups sites per molecule.

A preferred polyol combination for the invention has from 50 to 70% by weight conventional polyether polyol and 30 to 50% by weight graft polyol. The preferred polyether polyol has a functionality from 3.1 to 3.3 and hydroxyl number from 28 to 32. The polyether polyol should contain from 14 to 20% EO and greater than 75% primary OH groups. The preferred graft polyol has a functionality from 2.6 to 2.9 and a hydroxyl number from 25 to 30. It should contain styrene and acrylonitrile in a ratio of about 70 to 30.

The term "polyisocyanate" refers particularly to isocyanates that have previously been suggested for use in preparing polyurethane foams. "Polyisocyanates" include di- and poly-isocyanates and prepolymers of polyols and polyisocyanates having excess isocyanate groups available to react with additional polyol. The amount of polyisocyanate employed is frequently expressed by the term "index" which refers to the actual amount of isocyanate required for reaction with all of the active hydrogen-containing compounds present in the reaction mixture multiplied by 100. For most foam applications, the isocyanate index is in the range between about 75 to 140. In this invention, the preferred isocyanate index is in the range of 95 to 110.

Conventional polyisocyanates may be used in this invention. The preferred isocyanates are methylene diisocyanate (MDI), and mixtures of MDI with toluene diisocyanate (TDI). A commercially available MDI/TDI mixture is R-7411 from Huntsman/ICI. A well known toluene diisocyanate is TD80, a commercially available blend of 80% of 2, 4 toluene diisocyanate and 20% of 2,6 toluene diisocyanate. A preferred methylene diisocyanate is R-7400 from Hunstman/ICI, which is a prepolymer with a NCO content of 28.3% with over 50% 4,4'-methylene diisocyanate. Polyisocyanates are typically used at a level of between 20 and 90 parts by weight per 100 parts of polyol, depending upon the polyol OH content and the water content of the formulation.

In this invention, the isocyanate may be 100% MDI, with at least 50% by weight or more of the isocyanate comprising 4,4' methylene diisocyanate. If a MDI/TDI isocyanate mixture is used, at an isocyanate index from 95 to 110, preferably 100 to 105, the mixture may contain from 5 to 20 percent by weight TDI and 80 to 95% by weight MDI, with at least 50% by weight of the MDI component comprising 4,4' methylene diisocyanate. Most preferably, however, at least 55% by weight of the isocyanate component is 4,4' methylene diisocyanate.

Catalysts are used to control the relative rates of water-polyisocyanate (gas-forming) and polyol-polyisocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-polyisocyanate reaction, whereas the organotin catalysts are known to have a greater effect on the polyol-polyisocyanate reaction. Total catalyst levels generally vary from 0 to 5.0 parts by weight per 100 parts polyol. The amount of catalyst used depends upon the formulation employed and the type of catalyst, as known to those skilled in the art. Although various catalysts may be used in the present invention, control of the gelling catalyst level is critical to producing foams with desired air permeability, which is a factor known to significantly affect foam cushioning performance. We have found that the following ranges of catalyst amounts are satisfactory: amine catalyst from 0 to 2 parts per 100 parts polyol; and organotin catalyst from 0 to 0.5 parts per 100 parts polyol.

One or more surfactants are also employed in the foam-forming composition. The surfactants lower the bulk surface tension, promote nucleation of bubbles, stabilize the rising cellular structure and emulsify incompatible ingredients. The surfactants typically used in polyurethane foam applications are polysiloxane-polyoxyalkylene copolymers, which are generally used at levels between about 0.5 and 3 parts by weight per 100 parts polyol. In the present invention from 0 to 2 parts by weight per 100 parts polyol of surfactant is preferred, and 1 part by weight per 100 parts polyol is most preferred.

A blowing agent may be included in the foam-forming composition. The most typical blowing agent is water that may be added in amounts from 2 to 5.8 parts per hundred parts polyol. Preferably, water as blowing agent is added in an amount suitable to achieve a desired foam density, and the amount may vary depending upon the operating pressure in the foaming chamber. We have found that at pressures in the range of 0.5 to 0.9 bar, from 2 to 3.7 parts per hundred parts polyol is an appropriate amount of water to achieve a foam with a density of about 1.6 pounds per cubic feet.

Cross-linking agents may be included in the foam-forming composition to enhance processing and foam stability. Typically, cross-linking agents are relatively small molecules containing 2 or 3 active hydrogen groups, and are added in amounts from 0 to 2 parts per hundred parts polyol. Representative cross-linking agents that may be included in the reaction mixture of the invention are diethanolamine (DEOA), ethylene glycol (EG), diethylene glycol (DEG), propylene glycol (PG), dipropylene glycol (DPG), 1,4-butanediol (BDO), commercially available as Bayer AG DP1022 and R2580. Most preferably, the cross-linking agents are included in amounts from 0.3 to 0.5 parts per hundred parts polyol.

Optionally, other additives may be incorporated into the foam-forming composition. The optional additives include, but are not limited to, fire retardants, stabilizers, antimicrobial compounds, extender oils, dyes, pigments, and antistatic agents. Such additives should not have a detrimental effect on the properties of the final polyurethane foam.

The foam-forming process may be carried out batch-wise, semi-continuously or continuously, as long as the pressure may be controlled and maintained below atmospheric pressure, preferably in the range of about 0.5 to 0.9 bar, most preferably 0.6 to 0.8 bar (absolute). The foams produced with the stated reaction mixtures at these reduced pressures have lower densities in the range of 1.4 to 1.8 pounds per cubic foot ($lbs/ft^3$ or pcf).

FIG. 1 shows in schematic an apparatus that might be used to practice the invention in a continuous process. The figure is taken from the disclosure in WO93/09934. In such an apparatus 10, there is a process subchamber 12 and an adjacent airlock subchamber 14. The subchambers 12, 14 are separated from one another by door 30. Foam-forming ingredients are introduced to mix head 16 and mixed for a suitable time. Once mixed together, the foam-forming ingredients form a frothing liquid that is introduced to the bottom of trough 18 and flows upwardly and onto the fall plates 22. The foam rises as it is conveyed away from the trough. After the foam is completely risen, a foam slab 25 is then cut from the foamed material using cut off blade 26. The slab is conveyed by the moving conveyor 28. Fan 24 exhausts process gases to maintain the pressure within the process enclosure 12. The first door 30 opens to allow the slab 25 into the airlock enclosure 14. The door 30 closes and the pressure inside the airlocked chamber is returned to atmospheric conditions. A second exhaust fan 32 removes additional process gases. The foam slab 25 exits the airlock chamber 14 through door 24. The airlock chamber 14 is returned to operating pressure and the process continues.

The invention is further illustrated, but not limited by, the following examples.

EXAMPLES

Foams were prepared batch-wise on a laboratory scale in a fixed head foam machine with the formulations listed in Table 1. The water, isocyanates, polyols, surfactants, catalysts and other additives were poured from the fixed mixing head into a box positioned inside a chamber in which a vacuum was drawn. The pressure was maintained below atmospheric pressure by pumping air out of the chamber. Using a pressure regulator, the pressure was maintained at the operating pressure while the foam was allowed to rise. In the case of foams made at 1 Bar pressure, the boxes were located outside the chamber as pressure control was not necessary.

IFD or "indentation force deflection" was determined in accordance with a procedure similar to ASTM D 3574. In this case, for $IFD_{25}$ foam was compressed by 25% of its original height and the force was reported after one minute. For $IFD_{65}$, foam was compressed by 65% of its original height and the force was reported after one minute. The foam samples were cut to a size 15"×15"×4" prior to testing. The Support Factor or SAG Factor was calculated as the ratio of $IFD_{65}$ over $IFD_{25}$. The Support Factor provides a useful measure of the cushioning effectiveness of the foam.

Air permeability was determined in cubic feet per square foot per minute for each sample using a Frazier Differential Pressure Air Permeability Pressure Machine in accordance with ASTM 737.

TABLE 1

|  |  | A compare | B compare | C compare | D compare | E | F | G* compare | H* |
|---|---|---|---|---|---|---|---|---|---|
| polyol | HS100 | 35 | 35 | 35 | 35 | 35 | 35 | 30 | 35 |
| polyol | V-4001 | 65 | 65 | 65 | 65 | 65 | 65 | 70 | 65 |
| surfactant | B4690 | 0.7 | 0.7 | 0.7 | 0.7 | 0.7 | 0.7 | 0 | 0.7 |
| surfactant | B8707 | 0 | 0 | 0 | 0 | 0 | 0 | 0.7 | 0 |
| amine | ZF53 | 0.4 | 0.4 | 0.4 | 0.4 | 0.4 | 0.4 | 0.4 | 0.4 |
| tin catalyst | T-12 | 0.018 | 0.018 | 0.012 | 0.018 | 0.012 | 0.012 | 0.018 | 0.012 |
| stabilizer | DEA-LFG-85 | 1.95 | 1.95 | 0.5 | 1.95 | 0.5 | 0.5 | 1.95 | 0 |
| water |  | 2.11 | 3.48 | 2.59 | 3.71 | 2.90 | 2.90 | 3.05 | 2.92 |
| isocyanate | Rubinate 7400 | 0 | 0 | 46.5 | 0 | 51.6 | 51.6 | 0 | 49.6 |
| isocyanate | TDI 80/20 | 33.0 | 46.5 | 5.2 | 48.8 | 5.7 | 5.7 | 42.57 | 4.9 |
|  | Index | 102 | 102 | 102 | 102 | 102 | 102 | 102 | 102 |
|  | Chamber Pressure (mbar) | 1000 | 1000 | 1000 | 1000 | 700 | 600 | 1000 | 720 |
|  | Density (pcf) | 2.51 | 1.71 | 2.50 | 1.51 | 1.73 | 1.47 | 1.75 | 1.71 |
|  | IFD$_{25}$ (lb) | 26.1 | 21.1 | 46.1 | 21.8 | 26.2 | 14.7 | 21.3 | 22.5 |
|  | SAG | 2.50 | 2.31 | 2.55 | 2.34 | 2.68 | 2.85 | 2.36 | 2.64 |
|  | ½" perm. (ft$^3$/min./ft$^2$) | 260 | 370 | 225 | 305 | 412 | 390 | 323 | 302 |

*Foams of Examples G and H were prepared in a commercial machine rather than as a laboratory batch.

The polyols were obtained from the following suppliers: ARCOL® HS100 from Bayer AG; and VORANOL® 4001 from Dow Chemical. The surfactants B4690 and B8707 were obtained from Goldschmidt. The amine catalyst ZF53, the tin catalyst T-12 and the stabilizer DEA-LFG-85 were from Huntsman. The MDI RUBINATE® 7400 isocyanate was from Huntsman, and the TDI 80/20 was from Dow Chemical.

Referring to the data obtained in Table 1, we found that the foams according to the invention, such as Example E, had significantly higher Support Factor (SAG) values than the comparison examples foamed at atmospheric pressure, such as Example C.

The foams of Examples A and B were made with TDI as the only isocyanate. When the foam density was reduced from 2.5 to 1.7 pcf, there was a significant drop in the SAG (comparing the foam of Example A with that of Example B). The foam of Example C was made with an MDI-TDI isocyanate blend at atmospheric pressure. Due to the poor blowing efficiency of MDI, additional water was required in the foaming mix. When the SAG values of Examples C and A are compared, the MDI content of Example C appears to have produced a slightly improved SAG value of 0.05. In Example E, however, the SAG value was significantly improved with the combination of low chamber pressure and the MDI-TDI isocyanate blend. At a density of 1.73 pcf, the SAG value was 2.68. In Example F, the SAG value was further improved to 2.85 when a lower chamber pressure was used in combination with an MDI-TDI isocyanate blend. The SAG value of 2.85 was the highest achieved and the foam had a low 1.45 pcf density.

Thus, the combination of foaming ingredients and foaming pressures, particularly the use of MDI and reduced pressure foaming as shown in Examples E, F and H produced a higher support, lower density foam ideal for furniture cushion applications. The foams according to the invention have consistent density, and provide much greater plushness and support at lower density, than conventional foams used today for cushioning applications.

Figure 2:
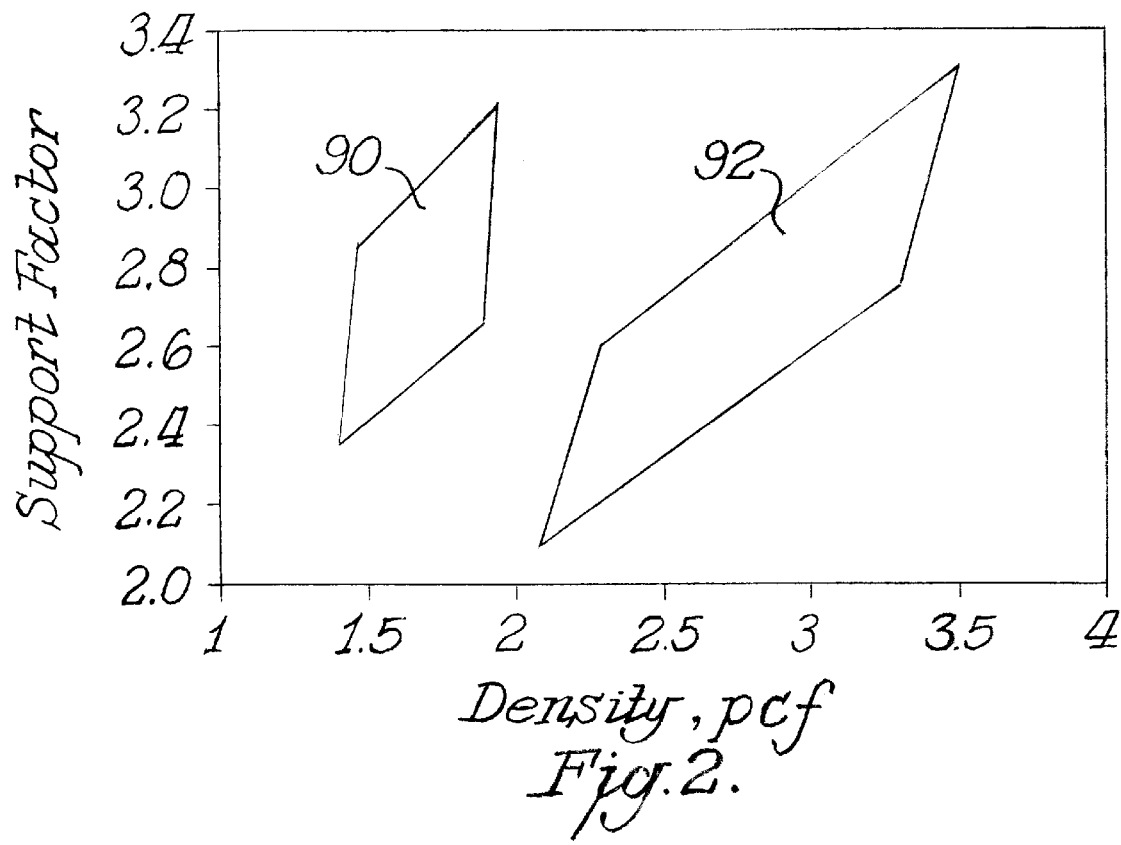
FIG. 2 is a schematic graph comparing support factor versus foam density of foams according to the invention with exemplary commercial prior art foams.

Referring to FIG. 2, a schematic graphical depiction of the support factor ranges for low density foams according to the invention 90 is compared with the support factor ranges expected for higher density foams according to the prior art 92. The foams of the invention achieve greater support factor values at lower densities. This means that more light-weight cushioning products of equivalent performance to higher weight conventional foams may be formed with the foams according to the invention.

The invention has been illustrated by detailed description and examples of the preferred embodiment. Various changes in form and detail will be within the skill of persons skilled in the art. Therefore, the invention must be measured by the claims and not by the description of the examples or the preferred embodiments.

We claim:

1. A method for producing a flexible, high resilience polyurethane foam, comprising the steps of:
   (1) preparing a reaction mixture comprising
      (a) a polyol mixture of (i) about 40 to 90 percent by weight total polyols of a polyether polyol having a primary hydroxyl group content of greater than 75 percent and from 14 to 30 percent ethylene oxide groups, and having a hydroxyl number in the range of about 20 to 36 and a functionality from 2.8 to 3.5, and (ii) about 10 to 60 percent by weight total polyols of a graft polyol having a ratio of styrene to acrylonitrile of about 80 to 20, and having a hydroxyl number in the range of about 25 to 50 and a functionality from 2.5 to 3.0;
      (b) an organic polyisocyanate selected from the group consisting of methylene diisocyanate and methylene diisocyanate mixed with toluene diisocyanate, wherein at least 50 percent of the methylene diisocyanate is 4,4' methylene diisocyanate, wherein if a mixture of methylene diisocyanate and toluene diisocyanate is used, the polyisocyanate mixture comprises from about 5 to 20 percent by weight toluene diisocyanate and about 80 to 95 percent by weight methylene diisocyanate, and wherein the isocyanate index is in the range of 95 to 110; and
      (c) from about 2 to 3.5 parts per hundred parts polyol of water as a blowing agent; and
   (2) allowing said reaction mixture to react while held at a pressure of about 0.5 to 0.9 bar (absolute) so as to form the polyurethane foam.

2. The method of claim 1, wherein the resulting polyurethane foam has a density in the range of 1.4 to 1.8 pounds per cubic foot.

3. The method of claim 1, wherein the resulting polyurethane foam has a support factor above about 2.4.

4. The method of claim 1, wherein from about 50 to 70 percent by weight total polyols of a polyether polyol having a primary hydroxyl group content greater than 75 percent and from 14 to 20 percent ethylene oxide groups, and having a hydroxyl number in the range of about 28 to 32 and a functionality from 3.1 to 3.3 is used to prepare the reaction mixture.

5. The method of claim 1, wherein from about 30 to 50 percent by weight total polyols of a graft polyol having a ratio of styrene to acrylonitrile of about 70 to 30 and with a hydroxyl number in the range of about 25 to 30, and having a functionality from 2.6 to 2.9 is used to prepare the reaction mixture.

6. The method of claim 1, wherein the reaction mixture contains up to two parts by weight per hundred parts polyol of a cross linking agent.

7. The method of claim 1, wherein the reaction mixture contains up to two parts by weight per hundred parts polyol of a surfactant.

8. The method of claim 1, wherein the reaction mixture contains up to two parts by weight per hundred parts polyol of a catalyst.

9. The method of claim 1, wherein the reaction mixture contains up to two parts by weight per hundred parts polyol of an amine catalyst.

10. The method of claim 1, wherein the reaction mixture contains up to 0.5 parts by weight per hundred parts polyol of a tin catalyst.

11. The method of claim 1, wherein the reaction mixture contains from about 2.0 to 3.7 parts by weight per hundred parts polyol of water as a blowing agent.

12. The method of claim 1, wherein the reaction mixture contains at least 55 percent by weight of 4,4' methylene diisocyanate.

13. The method of claim 1, wherein the reaction mixture contains at most about 10 percent by weight of toluene diisocyanate.

14. The method of claim 1, wherein the isocyanate index is in the range of from 95 to 100.

15. The method of claim 14, wherein the isocyanate index is in the range of from 100 to 105.

16. The method of claim 6, wherein the reaction mixture contains from 0.3 to 0.5 parts per hundred parts polyol of a cross-linking agent.

17. A polyurethane foam produced according to the method of claim 1.

18. A method for producing a flexible, high resilience polyurethane foam, comprising the steps of:
 (1) preparing a reaction mixture comprising
  (a) a polyol mixture of (i) about 50 to 70 percent by weight total polyols of a polyether polyol having a primary hydroxyl group content of greater than 75 percent and from 14 to 20 percent ethylene oxide groups, and having a hydroxyl number in the range of about 28 to 32 and a functionality from 3.1 to 3.3, and (ii) about 30 to 50 percent by weight total polyols of a graft polyol having a ratio of styrene to acrylonitrile of about 70 to 30, and having a hydroxyl number in the range of about 25 to 30 and a functionality from 2.6 to 2.9;
  (b) an organic polyisocyanate mixture comprising up to 10 percent by weight toluene diisocyanate and about 90 to 100 percent by weight methylene diisocyanate, wherein at least 55 percent of the methylene diisocyanate is 4,4' methylene diisocyanate, and wherein the isocyanate index is in the range of 100 to 105;
  (c) from about 2.8 to 3.2 parts per hundred parts polyol of water as a blowing agent; and
  (d) up to 1.0 parts per hundred parts polyol of a surfactant; and
 (2) allowing said reaction mixture to react while held at a pressure of about 0.6 to 0.8 bar (absolute) so as to form the polyurethane foam.

19. A polyurethane foam produced according to the method of claim 18.

* * * * *